Dec. 3, 1946.    R. R. HARWOOD    2,411,859
WELDING ELECTRODE CONSTRUCTION
Filed Oct. 2, 1944

INVENTOR.
RALPH R. HARWOOD
BY
Barnes, Kisselle, Laughlin & Raisch

Patented Dec. 3, 1946

2,411,859

UNITED STATES PATENT OFFICE 2,411,859

WELDING ELECTRODE CONSTRUCTION

Ralph R. Harwood, Detroit, Mich.

Application October 2, 1944, Serial No. 556,698

5 Claims. (Cl. 219—4)

This invention relates to a welding electrode construction.

It has particularly to do with a reinforcing tip for the end of the electrode.

Welding electrodes used in spot welding must be made of a conductive material such as copper which is subject to deforming after continued use.

It is an object of the present invention to provide a reinforcement for this electrode tip which will prevent this deforming and thus allow the tip to be used for a much greater length of time before it has to be replaced and reconditioned.

Figure 1:
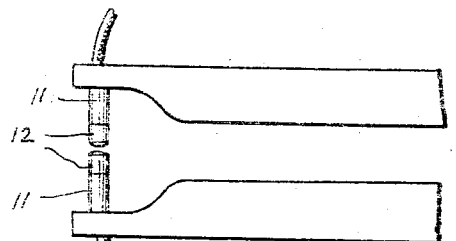
Fig. 1 shows a diagrammatic presentation of spot welding electrodes with the tips in place.
Figure 2:
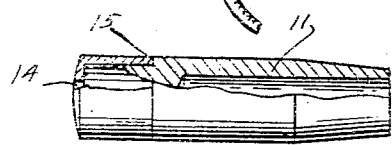
Figs. 2 to 5 show one embodiment of the invention.
Figure 6:
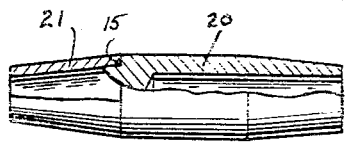
Figs. 6 to 9 show a second embodiment in a slightly different form.
Figure 3:
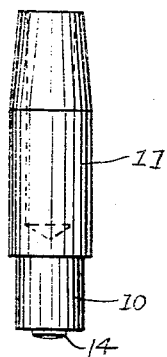
Figure 7:
Figure 4:
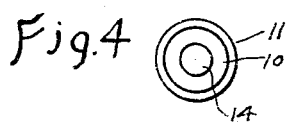
Figure 8:
Figure 5:
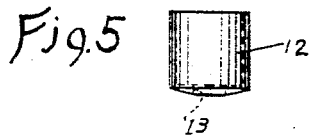
Figure 9:
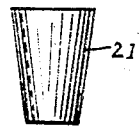

The hardness of copper used for electrodes is usually from 80 to 85 Brinell. I propose to cause a machining-down of the standard electrode to a shape shown in Fig. 3 at 10, and to add to the electrode, shown generally at 11, a cap 12 having a hole 13 to receive the formed tip 14 of the electrode permitting it to project a surface outwardly for contact with the work. Shoulder 15 on the tool abuts the end of the tip to reinforce and position it. The cap 12 must be made from a non-magnetic material such as a bronze or a brass which may have a Brinell hardness around 120 to 220. A Brinell of 130 has been found suitable.

Many attempts have been made to use steel jackets or reinforcement for electrode tips but they have proved unsuccessful. One reason advanced is that steel is subject to hysteresis heating and due to this heating it expands and drops off. However, heretofore it has been thought impossible to use a bronze or brass that is slightly harder than the copper since it was thought that it would deform in the same way as does the copper. The use of this slightly harder material directly surrounding the tip does give sufficient reinforcement so that the tool will stand up for an unexpected length of time.

In Figs. 6 to 9 I have shown an electrode 20 with a jacket 21 placed on a tapered end 22. In this case the small end of the electrode is exposed at the lower end of the tapered jacket where it may contact the work.

I claim:

1. A reinforcement for a spot welding electrode having a Brinell hardness of around 80 to 85 which comprises a jacket of a cupreous metal of a less deformability than copper and of the class which includes brass and bronze and having a Brinell hardness of about 130, extending from the operating end of the electrode to a point a short distance along the electrode and backed by a shoulder formed on the electrode, said reinforcement having an opening at the working end to expose a surface of the electrode.

2. A welding electrode comprising a piece of standard electrode material having a Brinell hardness of 80 to 85 shaped at the operating end to have a reduced portion to an abrupt shoulder and a jacket of a cupreous metal of a less deformability than copper and of the class which includes brass and bronze and for reinforcing the electrode covering the reduced portion and abutting against the shoulder formed in the electrode, and provided with an opening at the operating end to expose the electrode.

3. A welding electrode of relatively soft material such as copper and a reinforcing collar of cupreous metal of greater resistance to deformation than copper such as bronze, surrounding the tip of the electrode and open at the operating end to permit contact of the copper with the work.

4. A welding electrode comprising a piece of standard electrode material having Brinell hardness of 80 to 85 shaped at the operating end to have a reduced portion to an abrupt shoulder and a jacket of cupreous metal of greater resistance to deformation than copper such as brass for reinforcing the electrode covering the reduced portion and abutting against the shoulder formed in the electrode, and provided with an opening at the operating end to expose the electrode.

5. A reinforcement for a spot welding electrode having a Brinell hardness of around 80 to 85 which comprises a jacket of cupreous metal of greater resistance to deformation than copper having a Brinell hardness of about 120 to 220 extending from the operating end of the electrode to a point a short distance along the electrode and backed by a shoulder formed on the electrode, said reinforcement having an opening at the working end to expose a surface of the electrode.

RALPH R. HARWOOD.